US009276789B2

(12) United States Patent
Pook et al.

(10) Patent No.: US 9,276,789 B2
(45) Date of Patent: Mar. 1, 2016

(54) DEMODULATOR FOR FREQUENCY-SHIFT KEYED SIGNALS BY USING THE GOERTZEL ALGORITHM

(71) Applicant: ABB Technology AG, Zurich (CH)

(72) Inventors: Stefan Pook, Minden (DE); Olaf Schmidt, Minden (DE); Thomas Keul, Freigericht (DE)

(73) Assignee: ABB TECHNOLOGY AG, Zurich (CH)

( * ) Notice: Subject to any disclaimer, the term of this patent is extended or adjusted under 35 U.S.C. 154(b) by 0 days.

(21) Appl. No.: 14/152,034

(22) Filed: Jan. 10, 2014

(65) Prior Publication Data
US 2014/0192933 A1    Jul. 10, 2014

(30) Foreign Application Priority Data

Jan. 10, 2013  (DE) .......................... 10 2013 000 312

(51) Int. Cl.
*H04L 27/00* (2006.01)
*H04L 27/148* (2006.01)

(52) U.S. Cl.
CPC .................................... *H04L 27/148* (2013.01)

(58) Field of Classification Search
CPC ........ H04L 27/06; H04L 27/148; H04L 5/143
USPC ......... 375/316, 324, 326, 334, 340, 343, 344, 375/354
See application file for complete search history.

(56) References Cited

U.S. PATENT DOCUMENTS

| 4,080,661 | A | | 3/1978 | Niwa | |
|---|---|---|---|---|---|
| 5,818,296 | A | * | 10/1998 | Lee et al. | ....................... 329/300 |
| 6,047,033 | A | * | 4/2000 | Chen | ....................... H04L 7/027 375/326 |
| 2004/0190663 | A1 | * | 9/2004 | Carsello | .................. H04L 7/042 375/354 |
| 2006/0176979 | A1 | * | 8/2006 | Takahashi | .............. G01R 27/28 375/316 |
| 2012/0093264 | A1 | * | 4/2012 | Yamaguchi | ................... 375/340 |
| 2012/0221252 | A1 | | 8/2012 | Helnz et al. | |

OTHER PUBLICATIONS

German Examination Report dated Jul. 17, 2013 for German Application No. 10 2013 000 312.1.
Chiouguey J. Chen, Texas Instruments: Modified Goertzel Algorithm in DTMF Detection Using the TMS320C80, Jun. 1996, pp. 1-13.
(Continued)

*Primary Examiner* — Syed Haider
(74) *Attorney, Agent, or Firm* — Buchanan Ingersoll & Rooney PC

(57) ABSTRACT

Exemplary embodiments relates to a demodulator for frequency-shift keyed signals by using the Goertzel algorithm according to the general recursive calculating rule, where $$c_{re} = 2 * \cos\left(2 * \pi * \frac{f_g}{f_s}\right)$$

with the sampling frequency $f_s$ and the specified frequency $f_g$. To reduce the mathematical complexity in feed-power-limited devices, it is proposed that the sampling frequency $f_s$ is an integral multiple of the frequency $f_g$ of a specified discrete spectral component.

4 Claims, 3 Drawing Sheets

(56) References Cited

OTHER PUBLICATIONS

Wikipedia: Goertzel-Algorithmus [recherchiert Im Internet am Jul. 16, 2013; URL: http://de.wikikedia.org/wiki/Goertzel-Algorithmus].

Kevin Banks, The Goertzel Algorithm, Aug. 2002 [recherchiert im Internet am Jul. 16, 2013; URL: http://www.embedded.com].

DTMF Touch Tone Decoder Using Microchip PIC Microprocessor; Signal Processing Algorithm; Oct. 23, 2010.

Oppenheim Alan V. et al., Discrete-Time Signal Processing, The Goertzel Agorith, :Discrete-Time Signal Processing; Goertzel Agorith; Jan. 1, 1989 pp. 633-635.

Arslan, Guner, "Literature Survey on Dual-Tone Multiple Frequency DTMF Detector Implementation" Mar. 31, 1998, pp. 1-9.

European Search Report issued Apr. 12, 2014 (9 pages).

\* cited by examiner

DEMODULATOR FOR FREQUENCY-SHIFT KEYED SIGNALS BY USING THE GOERTZEL ALGORITHM

RELATED APPLICATION(S)

This application claims priority under 35 U.S.C. §119 to German application No. DE 102013000312.1, filed in Germany on Jan. 10, 2013, the entire content of which is hereby incorporated by reference in its entirety.

FIELD

The disclosure relates to a demodulator for frequency-shift keyed signals by using the Goertzel algorithm.

BACKGROUND INFORMATION

Frequency shift keying (FSK) is a modulation technique for transmitting digital signals. This technique is insensitive to interference. In frequency shift keying, the carrier frequency of a periodic sinusoidal oscillation is changed between a set of different frequencies which represent the individual transmitted symbols.

During the modulation, a transmitted symbol is assigned to a specified transmission frequency. On the other hand, during the demodulation, a specified frequency is detected and the corresponding symbol is output for further data processing. One exemplary parameter of frequency shift keying is an integral number of available transmission frequencies.

In its simplest form, only two different symbols are present, so-called binary FSK, which are transmitted via two different symbol frequencies f1 and f2. In this case, the bit rate is equal to the symbol rate. This form can be used for data transmission according to the HART protocol in measuring and control technology.

The Goertzel algorithm, as discussed at <<http://de.wikipedia.org/wiki/Goertzel-Algorithmus>>, is a digital signal processing technique and represents a special form of discrete Fourier transformation (DFT). In contrast to the various fast calculation methods in discrete Fourier transformation (DFT) which can calculate all discrete spectral components in one block, it is possible with the Goertzel algorithm to calculate only individual discrete spectral components.

The algorithm is based on a structure consisting of a digital filter which is extended by a state control factor. The states subdivide the calculation into the return branch in which the input values sampled in the time domain are loaded, and into a forward branch which delivers the output signal. The return loop can be passed with each digital sample and be configured as a recursive digital filter having two state memories and one accumulator. The forward branch can be passed once only after N samples and delivers from the state memories the calculated complex output value, the spectral component in amount and phase. The number of samples N can assume any positive integral values.

It is known that the quality of detection of a discrete spectral component increases with an increasing number of samples N.

The Goertzel algorithm can specify 4N additions and 4N multiplications per calculation of one spectral component, the symbol frequencies f1 and f2 in FSK. In principle, using the Goertzel algorithm in FSK demodulation is known from U.S. Pat. No. 5,818,296 A. The implementation of the Goertzel algorithm is described in the document "The Goertzel Algorithm", <<http://eetimes.com/design/embedded/4024443/The-Goertzel-Algorithm>>.

In addition, a technical implementation is known from the Application Report by the company Texas Instruments "Modified Goertzel Algorithm in DTMF Detection Using the TMS320C80", 1996, Digital Signal Processing Solutions. This refers to the detection of dialing tones and their combinations of the multi-frequency tone dialing method in telephony. In this context, the variable tone dialing frequencies, which are between 697 Hz and 1477 Hz, can be sampled with a fixed sampling rate of 8 kHz.

In principle, the Goertzel algorithm can be suitable for the demodulation of FSK signals as used in automation technology for communication between central and peripheral devices. However, this is in conflict with the still fairly high computing complexity, the time and power specified by which is not available, especially in real-time-capable peripheral devices which are fed from a conductor loop with limited power for reasons of explosion protection. Such a device has available a maximum of 96 mW for its entire operation. But this includes at least not conclusively means for communication, for signal processing in accordance with the respective automation-related task, for signal conversion, for measurement value detection or setpoint output and diagnostic means.

A demodulator for frequency-shift keyed signals is disclosed, comprising: a processor configured to filter a line signal, sample the filtered signal and process samples output from the filter with a Goertzel algorithm, comparing a result of the algorithm to a threshold to determine whether the filter output is to be feedback for further processing with the Goertzel algorithm.

SUMMARY

A demodulator for frequency-shift keyed signals is disclosed, comprising: a processor configured to filter input signals and process the filtered signals using a Goertzel algorithm according to a general recursive calculating rule $M=s[n]^2+s[n-1]^2+s[n]*s[n-1]*c_{re}$, where $s[n]=x[n]+c_{re}*s[n-1]-s[n-2]$, M is the magnitude of a specified discrete spectral component, $x[n]$ are the samples of the input signal, $s[n]$ are state signals, and $c_{re}$ is the feedback coefficient of the state signal $s[n-1]$, where $$c_{re} = 2*\cos\left(2*\pi*\frac{f_g}{f_s}\right)$$

with a sampling frequency $f_s$ and a specified frequency $f_g$, and wherein the sampling frequency $f_s$ is an integral multiple of the frequency $f_g$ of the specified discrete spectral component.

A method for demodulating frequency-shift keyed signals is disclosed, comprising: filtering input signals in a processor; processing, in a processor, the filtered signals using a Goertzel algorithm according to a general recursive calculating rule $M=s[n]^2+s[n-1]^2+s[n]*s[n-1]*c_{re}$, where $s[n]=x[n]+c_{re}*s[n-1]-s[n-2]$, M is a magnitude of a specified discrete spectral component, $x[n]$ are samples of the input signal, $s[n]$ are state signals, and $c_{re}$ is a feedback coefficient of the state signal $s[n-1]$, where $$c_{re} = 2*\cos\left(2*\pi*\frac{f_g}{f_s}\right)$$

with a sampling frequency $f_s$ and a specified frequency $f_g$, and wherein the sampling frequency $f_s$ is an integral multiple of the frequency $f_g$ of the specified discrete spectral component.

BRIEF DESCRIPTION OF THE DRAWINGS

In the text which follows, the disclosure will be explained in greater detail with reference to exemplary embodiments. The drawings are as follows:

FIG. 2 is a representation of a sequence of mathematical operations according to the Goertzel algorithm in its general form in accordance with an exemplary embodiment of the present disclosure;

FIG. 3 is a representation of a first sequence of mathematical operations according to the Goertzel algorithm in accordance with an exemplary embodiment of the present disclosure;

FIG. 4 is a representation of a second sequence of mathematical operations according to the Goertzel algorithm in accordance with an exemplary embodiment of the present disclosure;

FIG. 5 is a representation of a third sequence of mathematical operations according to the Goertzel algorithm in accordance with an exemplary embodiment of the present disclosure.

DETAILED DESCRIPTION

Figure 1:
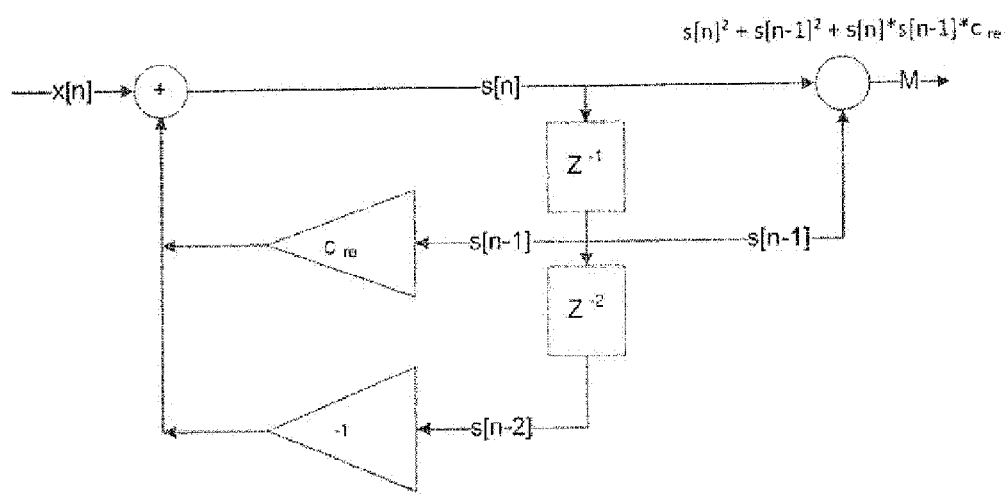
FIG. 1 is a block diagram of a Goertzel algorithm in accordance with an exemplary embodiment of the present disclosure.

Exemplary embodiments of the present disclosure provide a demodulator for frequency-shift keyed signals by using the Goertzel algorithm, the specified computing complexity of which allows it to be implemented in feed-power-limited devices.

The Goertzel algorithm, is specified according to the general recursive calculation rule $$M = s[n]^2 + s[n-1]^2 + s[n]*s[n-1]*c_{re}$$

where $$s[n] = x[n] + c_{re}*s[n-1] - s[n-2]$$

where

M is the magnitude of the specified discrete spectral component, x[n] are the samples of the input signal, s[n] are state signals and $c_{re}$ is the feedback coefficient of the state signal s[n−1].

The return branch of the digital filter according to the Goertzel algorithm includes a first and a second feedback stage. In the first feedback stage, the state of a first state memory with the feedback coefficient $c_{re}$ is fed back to the input signal x[n].

This feedback coefficient $c_{re}$ is described by the following equation:

$$c_{re} = 2*\cos\left(2*\pi*\frac{f_g}{f_s}\right)$$

where:

$f_s$—sampling frequency
$f_g$—specified frequency, symbol frequency

According to the disclosure, the sampling frequency is an integral multiple of the frequency of the specified discrete spectral component.

For example, the ratio of the sampling frequency to the frequency of the specified discrete spectral component is precisely one of the values 3, 4 and 6.

With an arbitrary ratio of the sampling frequency $f_s$ to the respective frequency of the specified discrete spectral component $f_g$ of $f_s/f_g \neq [3, 4, 6]$, the coefficient $c_{re}$ assumes a value from the range of real numbers. The mathematical implementation for calculating the feedback quantity from the first state memory is a multiple sequence of multiplications and additions. The multiplications can call for a comparatively high mathematical expenditure.

With a ratio of the sampling frequency $f_s$ to the respective frequency of the specified discrete spectral component $f_g$ of $f_s/f_g = 3$, the coefficient becomes $c_{re} = -1$. Accordingly, the state of the first state memory can be fed back with inverted sign. The mathematical implementation of the inversion of the sign of a quantity is a bit operation which is carried out in one mathematical step.

With a ratio of the sampling frequency $f_s$ to the respective frequency of the specified discrete spectral component $f_g$ of $f_s/f_g = 4$, the coefficient becomes $c_{re} = 0$. Accordingly, the state of the first state memory is not fed back. This dispenses with all mathematical steps for calculating the feedback quantity from the first state memory without replacement.

With a ratio of the sampling frequency $f_s$ to the respective frequency of the specified discrete spectral component $f_g$ of $f_s/f_g = 6$, the coefficient becomes $c_{re} = 1$. Accordingly, the state of the first state memory is fed back with the correct sign, is unchanged.

In an exemplary embodiment of the present disclosure, the Goertzel algorithm can be implemented with the ratios the disclosure of the sampling frequency $f_s$ to the respective frequency of the specified discrete spectral component $f_g$ with a reduced number of mathematical steps, e.g., elaborate multiplications. The reduced mathematical complexity makes it possible to manage with a lower power for calculating the respective magnitude of the specified discrete spectral component. Advantageously, the Goertzel algorithm can thus be implemented also in feed-power-limited devices. Relative details are specified in the exemplary embodiments.

FIG. 1 is a block diagram of a Goertzel algorithm in accordance with an exemplary embodiment of the present disclosure. The filter includes a return branch through which each digital sample x[n] passes and which includes two successive state memories $Z^{-1}$ and $Z^{-2}$. The output signals s[n=1] and s[n−2] of the state memories $Z^{-1}$ and $Z^{-2}$ are fed back, weighted individually, to the respective digital sample x[n], forming the symbol value s[n]. In this context, the output signal s[n−1] of the first state memory $Z^{-1}$ is weighted with the feedback coefficient $c_{re}$ and the output signal s[n−2] of the second state memory $Z^{-2}$ is weighted with the factor −1. The feedback coefficient $c_{re}$ is described by the following equation:

$$c_{re} = 2*\cos\left(2*\pi*\frac{f_g}{f_s}\right)$$

where:

$f_s$—sampling frequency
$f_g$—specified frequency, symbol frequency.

Furthermore, the digital filter includes a forward branch in which the output signal s[n−1] of the first state memory $Z^{-1}$ is linked with the symbol value s[n] to form the complex filter output value M which describes the specified spectral component $f_g$ in amount and phase.

FIG. 2 is a representation of a sequence of mathematical operations according to the Goertzel algorithm in its general form in accordance with an exemplary embodiment of the present disclosure. In particular, FIG. 2 shows the sequence of mathematical operations according to the Goertzel algorithm in its general form for n=6 support points X0 to X5. In order to reach the specified filter output value M, 9 multiplications and 11 additions are performed for each specified discrete spectral component $f_g$. This mathematical expenditure calls for 53 computing steps of the executing processor, such as, for example, an MSP430 by the company Texas Instruments, for its processing.

FIG. 3 is a representation of a first sequence of mathematical operations according to the Goertzel algorithm in accordance with an exemplary embodiment of the present disclosure. In particular, FIG. 3 shows the sequence of mathematical operations according to the Goertzel algorithm with the boundary condition that the ratio of the sampling frequency $f_s$ to the respective frequency of the specified discrete spectral component $f_g$ is $f_s/f_g=3$, for n=6 support points X0 to X5.

In this context, the feedback coefficient $c_{re}$ assumes the value of $c_{re}=-1$. In this embodiment, the output signal s[n−1] of the first state memory $Z^{-1}$ is fed back, weighted with the inverted sign, to the respective digital sample x[n]. The mathematical implementation of the inversion of the sign of a quantity is a bit operation which is carried out in one mathematical step.

In order to reach the specified filter output value M in this embodiment, 3 multiplications and 8 additions are called for each specified discrete spectral component $f_g$. This mathematical effort can call for 20 computing steps of the executing processor, such as, for example, MSP430 by the company Texas Instruments, for its processing, and thus 62% less than according to the known Goertzel algorithm in its general form.

FIG. 4 is a representation of a second sequence of mathematical operations according to the Goertzel algorithm in accordance with an exemplary embodiment of the present disclosure. For example, FIG. 4 shows the sequence of mathematical operations according to the Goertzel algorithm with the boundary condition that the ratio of the sampling frequency $f_s$ to the respective frequency of the specified discrete spectral component $f_g$ is $f_s/f_g=4$, for n=6 support points X0 to X5.

In this context, the feedback coefficient $c_{re}$ assumes the value of $c_{re}=0$. In this embodiment, the output signal s[n−1] of the first state memory $Z^{-1}$ is not fed back to the respective digital sample x[n]. This dispenses with all mathematical steps for calculating the feedback quantity from the first state memory $Z^{-1}$ without replacement.

In order to reach the specified filter output value M in this embodiment, 2 multiplications and 5 additions are called for each specified discrete spectral component $f_g$. This mathematical effort calls for 11 mathematical steps of the executing processor, such as, for example, MSP430 by the company Texas Instruments, and thus 79% less than according to the known Goertzel algorithm in its general form.

FIG. 5 is a representation of a third sequence of mathematical operations according to the Goertzel algorithm in accordance with an exemplary embodiment of the present disclosure. In particular, FIG. 5 shows the sequence of mathematical operations according to the Goertzel algorithm with the boundary condition that the ratio of the sampling frequency $f_s$ to the respective frequency of the specified discrete spectral component $f_g$ is $f_s/f_g=6$, for n=6 support points X0 to X5.

In this context, the feedback coefficient $c_{re}$ assumes the value of $c_{re}=1$. In this embodiment, the output signal s[n−1] of the first state memory $Z^{-1}$ is fed back with the correct sign, that is to say unchanged, to the respective digital sample x[n].

In order to reach the specified filter output value M in this embodiment, 3 multiplications and 8 additions are called for. This mathematical effort calls for 20 mathematical steps of the executing processor, such as, for example, MSP430 by the company Texas Instruments, and thus 62% less than according to the known Goertzel algorithm in its general form.

With these boundary conditions, a demodulator for frequency-shift keyed signals can be implemented by using the Goertzel algorithm in feed-power-limited devices.

Figure 6:
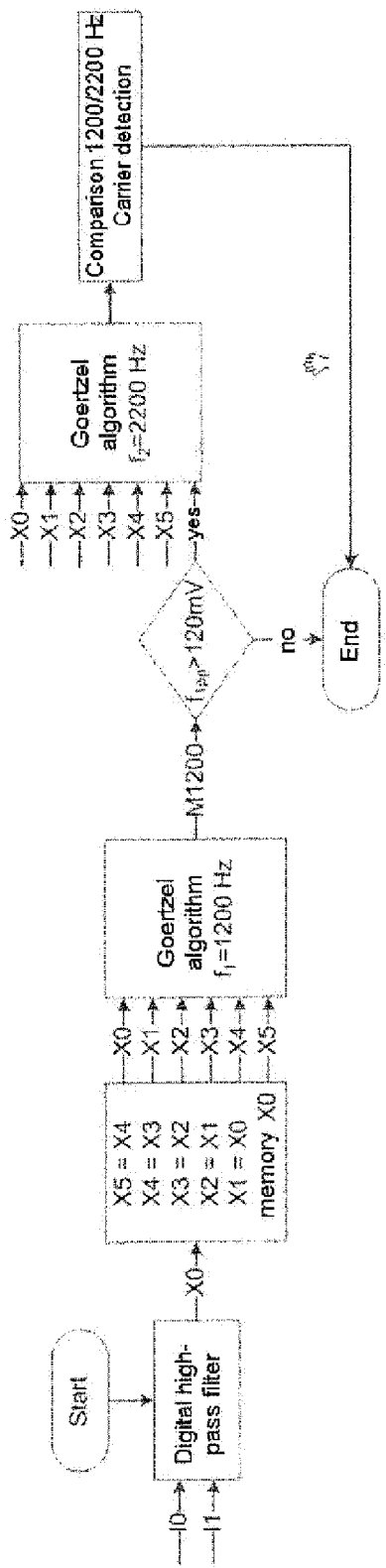
FIG. 6 is a representation of an implementation of the demodulator for carrier detection according to an exemplary embodiment of the present disclosure.

FIG. 6 is a representation of an implementation of the demodulator for carrier detection according to an exemplary embodiment of the present disclosure. In particular, FIG. 6 shows a basic representation of the implementation of the demodulator for carrier detection in frequency-shift keyed signals. In this context, the frequency is keyed between 1200 Hz and 2200 Hz, for example. These frequencies are designated as symbol frequencies and sought in each case as discrete spectral component $f_g$ during the demodulation. With a symbol frequency of $f_1$=1200 Hz, a logical one is transmitted and with the other symbol frequency $f_2$=2200 Hz, a logical zero is transmitted.

Firstly, the line signal is filtered in a digital high-pass filter. The filtered line signal is sampled and applied to the samples X0 to X5 of the Goertzel algorithm, preferably with a sampling frequency $f_s$=7200 Hz, that is to say of the magnitude of six times the frequency of the specified symbol frequency $f_1$=1200 Hz. The filter output value M is evaluated. If the amplitude of the filter output value M1200 exceeds a voltage of 120 mV, the Goertzel algorithm is applied again to the existing samples X0 to X5, but in its general form, in a first embodiment.

In another exemplary embodiment, new samples X0 to X5 are now determined with a sampling frequency $f_s$=13200 Hz, that is to say of the magnitude of six times the frequency of the specified symbol frequency $f_2$=2200 Hz, for determining the filter output value M2200 of the second specified symbol frequency $f_2$=2200 Hz, and the Goertzel algorithm is applied in its form according to the disclosure.

Independently of the type of determination of the filter output value M2200 of the second specified symbol frequency $f_2$=2200 Hz, the amplitudes of the filter output values M1200 and M2200 of both symbol frequencies $f_1$=1200 Hz and $f_2$=2200 Hz are compared with one another. If the amplitude of the filter output value M1200 exceeds the amplitude of the filter output value M2200, a logical one is output. Otherwise, a logical zero is output if the amplitude of the filter output value M2200 exceeds the amplitude of the filter output value M1200.

Thus, it will be appreciated by those skilled in the art that the present disclosure can be embodied in other specific forms without departing from the spirit or essential characteristics thereof. The presently disclosed embodiments are therefore considered in all respects to be illustrative and not restricted. The scope of the disclosure is indicated by the appended claims rather than the foregoing description and all changes that come within the meaning and range and equivalence thereof are intended to be embraced therein.

LIST OF REFERENCE DESIGNATIONS x[n] sample
$Z^{-1}$, $Z^{-2}$ state memory
$C_{re}$ feedback coefficient
s[n] symbol value
s[n−1], s[n−2] output signal
M filter output value
X0 to X5 support point

What is claimed is:

1. A demodulator for frequency-shift keyed signals, comprising:
    a first state memory configured to store a state signal; and
    a processor configured to filter input signals and process the filtered signals using a Goertzel algorithm according to a general recursive calculating rule $M=s[n]^2+s[n-1]^2+s[n]*s[n-1]*c_{re}$
    where $s[n]=x[n]+c_{re}*s[n-1]-s[n-2]$,
    M is the magnitude of a specified discrete spectral component,
    x[n] are the samples of the input signal,
    s[n] are state signals, and
    $c_{re}$ is the feedback coefficient of the state signal s[n−1], where $$c_{re} = 2*\cos\left(2*\pi*\frac{f_g}{f_s}\right)$$

with a sampling frequency $f_s$ and a specified frequency $f_g$,
    wherein the sampling frequency $f_s$ is an integral multiple of the frequency $f_g$ of the specified discrete spectral component,
    wherein if a ratio of the sampling frequency $f_s$ to the frequency $f_g$ of the specified discrete spectral component is 4, the feedback coefficient $c_{re}$ equals zero such that the state signal of the first state memory is not fed back, and
wherein if a ratio of the sampling frequency $f_s$ to the frequency $f_g$ of the specified discrete spectral component is 6, the feedback coefficient $c_{re}$ equals one such that the state signal of the first state memory is fed back.

2. A method for demodulating frequency-shift keyed signals, comprising:
    filtering input signals in a processor;
    processing, in the processor, the filtered signals using a Goertzel algorithm according to a general recursive calculating rule $M=s[n]^2+s[n-1]^2+s[n]*s[n-1]*c_{re}$
    where $s[n]=x[n]+c_{re}*s[n-1]-s[n-2]$,
    M is a magnitude of a specified discrete spectral component,
    x[n] are samples of the input signal,
    s[n] are state signals, and
    $c_{re}$ is a feedback coefficient of the state signal s[n−1], where $$c_{re} = 2*\cos\left(2*\pi*\frac{f_g}{f_s}\right)$$

with a sampling frequency $f_s$ and a specified frequency $f_g$,
    wherein the sampling frequency $f_s$ is an integral multiple of the frequency $f_g$ of the specified discrete spectral component, and
    wherein if a ratio of the sampling frequency $f_s$ to the frequency $f_g$ of the specified discrete spectral component is 4, the feedback coefficient $c_{re}$ zero such that a state signal of a first state memory is not fed back, and
    wherein if a ratio of the sampling frequency $f_s$ to the frequency $f_g$ of the specified discrete spectral component is 6, the feedback coefficient $c_{re}$ equals one such that the state signal of the first state memory is fed back.

3. A demodulator for frequency-shift keyed signals, comprising:
    a high-pass filter configured to filter a line signal;
    a processor configured to sample the filtered signal and process samples output from the filter with a Goertzel algorithm, comparing a result of the algorithm to a threshold to determine whether the filter output is to be feedback for further processing with the Goertzel algorithm,
    wherein the processor is configured to execute the Goertzel algorithm according to a general recursive calculating rule $M=s[n]^2+s[n-1]^2+s[n]*s[n-1]*c_{re}$
    where $s[n]=x[n]+c_{re}*s[n-1]-s[n-2]$,
    M is a magnitude of a specified discrete spectral component,
    x[n] are samples of the input signal,
    s[n] are state signals, and
    $c_{re}$ is a feedback coefficient of the state signal s[n−1], where $$c_{re} = 2*\cos\left(2*\pi*\frac{f_g}{f_s}\right)$$

with a sampling frequency $f_s$ and a specified frequency $f_g$,
    wherein if the line signal is filtered at a sampling frequency having a magnitude that is four times a frequency of a specified symbol frequency of the line signal the filter output is not fed back, and
wherein if the line signal is filtered at a sampling frequency having a magnitude that is six times a frequency of a specified symbol frequency of the line signal the filter output is fed back.

4. The demodulator of claim 2, wherein if a ratio of the sampling frequency $f_s$ to the frequency $f_g$ of the specified discrete spectral component is 4, the feedback coefficient $c_{re}$ is zero such that a state signal of a first state memory is not fed back, and wherein if a ratio of the sampling frequency $f_s$ to the frequency $f_g$ of the specified discrete spectral component is 6, the feedback coefficient $c_{re}$ equals one such that the state signal of the first state memory is fed back.

* * * * *